(12) United States Patent
Allan et al.

(10) Patent No.: US 8,553,562 B2
(45) Date of Patent: *Oct. 8, 2013

(54) AUTOMATED TRAFFIC ENGINEERING FOR MULTI-PROTOCOL LABEL SWITCHING (MPLS) WITH LINK UTILIZATION AS FEEDBACK INTO THE TIE-BREAKING MECHANISM

(75) Inventors: David Ian Allan, Ottawa (CA); Scott Andrew Mansfield, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 327 days.

This patent is subject to a terminal disclaimer.

(21) Appl. No.: 12/877,830

(22) Filed: Sep. 8, 2010

(65) Prior Publication Data

US 2012/0057466 A1    Mar. 8, 2012

(51) Int. Cl.
*H04L 12/24*    (2006.01)

(52) U.S. Cl.
USPC ............................................................ 370/238

(58) Field of Classification Search
USPC ........................................................ 370/238
See application file for complete search history.

(56) References Cited

U.S. PATENT DOCUMENTS

| | | | |
|---|---|---|---|
| 7,136,357 B2 * | 11/2006 | Soumiya et al. | ............... 370/236 |
| 2006/0198323 A1 | 9/2006 | Finn | |
| 2007/0002770 A1 | 1/2007 | van Haalen et al. | |
| 2008/0159277 A1 | 7/2008 | Vobbilisetty et al. | |
| 2009/0234969 A1 | 9/2009 | Mohan et al. | |
| 2009/0285101 A1 | 11/2009 | Lu | |
| 2009/0285208 A1 | 11/2009 | Lu | |
| 2009/0290588 A1 * | 11/2009 | Kawahigashi | ................ 370/400 |
| 2009/0323687 A1 | 12/2009 | Nishimura | |
| 2010/0157821 A1 | 6/2010 | Morris | |
| 2010/0232316 A1 | 9/2010 | Takacs | |
| 2011/0194404 A1 | 8/2011 | Kluger et al. | |

OTHER PUBLICATIONS

Non-Final Office Action, U.S. Appl. No. 12/877,826, dated Dec. 31, 2012, 9 pages.
"Virtual Bridged Local Area Networks-Amendment 8: Shortest Path Bridging", *IEEE* P802.1aq/D2.5; Jan. 6, 2010; 210 pages.
Notice of Allowance, U.S. Appl. No. 12/877,826, dated Jul. 11, 2013, 12 pages.

\* cited by examiner

*Primary Examiner* — Albert T Chou
(74) *Attorney, Agent, or Firm* — Blakely, Sokoloff, Taylor & Zafman

(57) ABSTRACT

A method implemented in a node of a multi-protocol label switching (MPLS) network for improved load distribution, including determining a first set of one or more shortest paths between each MPLS node pair, selecting at least a first shortest path by applying the common algorithm tie-breaking process, calculating a link utilization value for each link of the MPLS network, determining a second set of one or more shortest paths between each MPLS node pair, generating a path utilization value for each shortest path in the second set of shortest paths based on link utilization values corresponding to each shortest path, and selecting a second shortest path from the second set of shortest paths on the basis of said path utilization value, whereby the selection of the second subsets in light of path utilization minimizes the standard deviation of load distribution across the entire MPLS network.

18 Claims, 7 Drawing Sheets

AUTOMATED TRAFFIC ENGINEERING FOR MULTI-PROTOCOL LABEL SWITCHING (MPLS) WITH LINK UTILIZATION AS FEEDBACK INTO THE TIE-BREAKING MECHANISM

CROSS-REFERENCE TO RELATED APPLICATION

Cross-reference is made to a co-pending patent application by David Ian Allen and Scott Andrew Mansfield for "AUTOMATED TRAFFIC ENGINEERING FOR 802.1AQ BASED UPON THE USE OF LINK UTILIZATION AS FEEDBACK INTO THE TIE BREAKING MECHANISM" filed on the same date as the present application and commonly owned. The cross-referenced application is incorporated herein by reference.

FIELD OF THE INVENTION

The embodiments of the invention relate to a method and apparatus proving load distribution in a network. Specifically, the embodiments of the invention relate to a method for load spreading in Multi-Protocol Label Switching (MPLS) networks with multiple equal cost paths between nodes in the network.

BACKGROUND

Load distribution or load spreading is a method by which bandwidth is more effectively utilized and overall performance is improved in a network. Most automated load distribution and load spreading techniques deployed today operate with only a very local view, these load distribution and load spreading techniques only consider the number of paths or the next hops to a given destination and do not consider the overall distribution of traffic in the network.

Equal cost multi-path (ECMP) is a common strategy for load spreading of unicast traffic in routed networks that is utilized where the decision as to how to forward a packet to a given destination can resolve to any of multiple "equal cost" paths, which tied for being the shortest path when running database calculations. ECMP can be used in conjunction with most unicast routing protocols and nodes equipped with the required supporting data plane hardware, since it relies on a per hop decision that is local to a single router and assumes promiscuous receipt and a complete forwarding table at every intermediate node. Using ECMP at any given node in a network, the load is divided pseudo-evenly across the set of equal cost next hops. This process is implemented independently at each hop of the network where more than one path to a given destination exists.

In many implementations, when the presence of multiple equal cost next hops is encountered, each packet is inspected for a source of entropy such as an Internet Protocol (IP) header and a hash of header information modulo of the number of paths is used to select the next hop for the particular packet. For highly aggregated traffic, this method will on average distribute the load evenly in regular topologies (i.e., symmetric topologies) and does offer some improvement in less regular topologies.

Multiprotocol label switching (MPLS) is a combination of a data plane and control plane technology utilized to forward traffic over a network. MPLS uses per hop labels that are assigned to a stream of traffic to forward the traffic across the network using label lookup and translation (referred to as "swapping"). Each node of the network supports MPLS by reviewing incoming traffic received over the network and forwarding that traffic based on its label, the label is typically translated or "swapped" at each hop.

MPLS networks can improve the distribution of routed traffic in the network using per hop ECMP to distribute or spread a load across equal cost paths. In MPLS networks, a label switch path (LSP) is set up to each next hop for each equal cost path by every node in the network. The forwarding path for a given destination in the network is calculated using a shortest path first (SPF) algorithm at each node in the network, mapped to the local label bindings in the node, and the resultant connectivity appears as a multi-point to multi-point mesh. Individual nodes when presented with traffic destined for multiple equal costs paths utilize payload information as part of the path selection mechanism in order to maximize the evenness of flow distribution across the set of paths. The establishment of the multi-point to multi-point LSP is automated.

The label distribution protocol (LDP) or similar protocol is used to overprovision a complete set of label bindings for all possible forwarding equivalence classes in the network, and then each label switch router (LSR) independently computes the set of next hops for each forwarding equivalence class and selects which label bindings it will actually use at any given moment.

SUMMARY

A method implemented in a node of a multi-protocol label switching (MPLS) network for improved load distribution, wherein the node is one of a plurality of nodes in the MPLS network each of which implement a common algorithm tie-breaking process to produce minimum cost shortest path trees, the node includes a topology database to store a topology of the MPLS network, wherein the topology of the MPLS network includes a plurality of nodes and links between the nodes, the method comprising the steps of: determining a first set of one or more shortest paths between each MPLS node pair in the MPLS network by executing a shortest path search algorithm on the topology of the MPLS network stored in the topology database; selecting at least a first shortest path from the first set of shortest paths for each MPLS node pair, by applying the common algorithm tie-breaking process; calculating a link utilization value for each link of the MPLS network based on the count of shortest paths selected that transit each link; determining a second set of one or more shortest paths between each MPLS node pair in the MPLS network by executing the shortest path search algorithm on the topology of the MPLS network stored in the topology database; generating a path utilization value for each shortest path in the second set of one or more shortest paths based on link utilization values corresponding to each shortest path; selecting a second shortest path from the second set of one or more shortest path on the basis of said path utilization value, wherein the selecting utilizes the common algorithm tie-breaking process when multiple shortest paths having equal path utilization values are present in the set of one or more shortest paths; and storing at least the first shortest path and the second shortest paths for each MPLS node pair in a label information database, wherein the label information database indicates where to forward traffic incoming to the MPLS node, whereby the selection of the second subsets in light of path utilization minimizes the standard deviation of load distribution across the entire MPLS network.

A network element for improved load distribution in a multi-protocol label switching (MPLS) network that includes the network element, wherein the network element is one of a plurality of nodes in the MPLS network, wherein a topology of the MPLS network includes a plurality of nodes and links between the nodes, the network element comprising: a topology database to store link information for each link in the MPLS network; a label information database to store label information for each port of the network element, wherein the label information database indicates where to forward each forwarding equivalency class (FEC) incoming to the network element; a control processor coupled to the topology database and the label information database, the network processor configured to process data traffic, wherein the network processor comprises: an MPLS management module configured to forward data traffic over label switch paths (LSPs); a label distribution protocol (LDP) module configured to establish LSPs in the MPLS network; a shortest path search module configured to determine at least one shortest path between each MPLS node pair in the MPLS network by executing a shortest path search algorithm on the topology database, wherein the shortest path search module is configured to send, for each of the MPLS node pairs with a plurality of equal cost shortest paths, the equal costs shortest paths to a load distribution module; a sorting module configured to rank each of the plurality of equal cost shortest paths based on a path utilization value derived from link utilization values associated with each path in the plurality of equal cost shortest paths; and the load distribution module configured to select, from the plurality of equal cost shortest paths received, a first subset of the plurality of equal cost shortest paths for that MPLS node pair to be used to share data traffic load between the MPLS node pair and to select, based on the path utilization value, a second subset from the plurality of equal cost shortest paths for that MPLS node pair to be used to share data traffic load with the first subset for that Ethernet Bridge pair, whereby the selection of the second subset in light of the path utilization value minimizes the standard deviation of load distribution across the entire MPLS network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
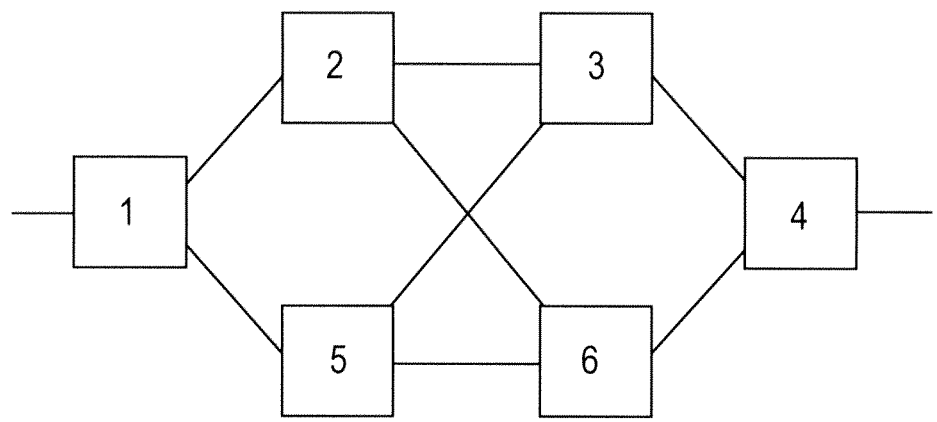
FIG. 1 is a diagram of an example of a network topology.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The embodiments include a basic tie-breaking process with specific properties including the properties that the process will always resolve to a single path, is independent of the order or direction of computation, and has a locality property such that a tie for any portion of the considered path can be resolved without having to consider the entire path.

The operations of the flow diagrams will be described with reference to the exemplary embodiment of FIG. 2. However, it should be understood that the operations of the flow diagrams can be performed by embodiments of the invention other than those discussed with reference to FIG. 2, and the embodiment discussed with reference to FIG. 2 can perform operations different than those discussed with reference to the flow diagrams of FIGS. 3 and 4. FIGS. 1 and 5-7 provide example topologies and scenarios that illustrate the implementation of the principles and structures of FIGS. 2, 3 and 4.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: poor performance in asymmetrical topologies, lack of support for operations, administration and management (OAM) protocols, high resource requirements for per packet inspection, high levels of dilation to achieve reasonable network utilization, multiple metric set generation and maintenance, and significant resources required to make small changes in state.

The embodiments of the invention overcome these disadvantages by enabling dynamic traffic engineering while minimizing a number of traversals of the topology database for a network. The load distribution method incorporates dynamic traffic engineering and utilizes the instantiation of multiple sets of equal cost paths in the forwarding plane, which can be aggregated into sets of equal cost trees, whereby the cumulative number of shortest paths transiting each link in a path resulting from all previous iterations of the path generation process factor into tie-breaking for the generation of the next set of paths. Once a node has performed an initial path selection using the tie-breaking process, and has processed all node pairs in the topology database, the number of shortest paths transiting each link is determined and is referred to as a link utilization value. For each subsequent pass of the database to generate further path sets, the set of shortest paths between any two node pairs is pruned by ranking the lexicographically sorted list of link utilization values for each link in each path being considered. If the ranked list has a unique lowest utilized path, then that path is selected. If the ranked list does not have a unique lowest utilized path, then the basic tie-breaking process is applied to the subset of shortest paths that tied for the lowest link utilization.

In the load distribution method and system, a model of the network load is computed in each iteration of path generation taking into account the tie-breaking of previous iterations in order to even out the loading of links in the network. The improved algorithm inherently favors the selection of less loaded links in each iteration after the first iteration.

The load distribution process utilizes a tie-breaking process with distinct properties such that for a path between any two points it will resolve to a single symmetric path regardless of the direction of computing, order of computing or examination of any subset of the path, a property described as "any portion of the shortest path is also the shortest path." Or stated another way, where a tie occurs along any portion of the shortest path, those nodes will resolve the tie for the subset of the path with the same choice, the result being a minimum cost shortest path tree. This is referred to herein as the "common algorithm tie-breaking" process.

In the load distribution process, an initial pass of the topology database utilizing the common algorithm tie-breaking process results in the generation of the first set of trees. This is because no load on any link has been recorded, hence all equal cost paths will be tied for utilization where the definition of equal cost is lowest metric and lowest number of hops. The initial step requires the determination of the shortest path between each of the MPLS node pairs in the network and where more than one shortest path between any two MPLS nodes is found the common algorithm tie-breaking process is utilized for tie-breaking in order to generate a unique path selection between each of the MPLS node pairs in the network and to generate one or more sets of equal cost forwarding trees, termed an "ECT set."

The load distribution process can rank the equal cost paths and determine low and high ranked paths, or 'bookend' paths, where both paths exhibit a set of requisite properties. This load distribution process can thereby select more than one path from a single "all pairs" pass of the database. The load distribution process also computes the number of shortest paths that traverse each link on the basis of paths actually selected by previous tie breaking procedures. This value is referred to as the "link utilization" value, which can be used to in subsequent computation. The link utilization values can be the count of MPLS node pairs whose shortest path transits the link. In other embodiments, more sophisticated possibilities exist to be used in place of link utilization considering additional information in the topology database.

In subsequent passes through the database to generate further sets of paths or trees, the set of shortest paths between any two MPLS nodes is first ranked by generating path utilization values that can include the lexicographically sorted link utilization values for each of the paths or simply the sum of the utilization of each link in the path and then ranking the resulting paths based on the path utilization values. Two or more ranking schemes can be also utilized, because when selecting more than one path when generating a set of equal cost paths or trees it is advantageous to minimize the number of times the same path is selected. Using multiple link rankings that demonstrate diversity can minimize the number of iterations needed to select multiple paths. When the ranking process generates a single lowest utilized path, it can be selected without further processing. When more than one ranking (e.g., a lowest ranking and a highest ranking) is considered, then the lowest utilized path is selected as both the lowest and highest ranking path. When there is more than one equally lowest utilized path, the common algorithm tie-breaking process is applied to the set of lowest utilized paths to make the selection. In one embodiment, more than one ranking may be selected from this step. When more than one load ranking mechanism is utilized (e.g. sum and lexicographic sort of loads as ranking) it is further possible to extract multiple rankings from each when ties occur.

Additional passes or iterations through the topology database can be performed and in each iteration, the link utilization value assigned to each link in a path is the cumulative measure or indication of shortest paths that transit the link selected during all the previous passes through the topology database.

FIG. 1 is a diagram of one embodiment of an example network topology. The example network topology includes six nodes with corresponding node identifiers 1-6. No path pairs have been determined for the network topology. An exemplary common algorithm tie-breaking process is utilized that ranks the paths lexicographically using the node identifiers. Examining the set of paths of equal cost between node 1 and node 4 will generate the following ranked set of path identifiers (note the path identifiers have been lexicographically sorted such that the node identifiers do not appear as a transit list):

1-2-3-4
1-2-4-6
1-3-4-5
1-4-5-6

This initial application of the tie-breaking process will select 1-2-3-4 and 1-4-5-6 as the low and high ranked paths between these nodes. For simplicity in this example, only node pair 1 and 4 are considered in determining the path count for the network rather than the shortest path trees from all six nodes. In this example, the links in the selected links paths are each then assigned a path pair count of 1. For the next pass through the topology database the load distribution process would yield the following lexicographic sort of link loading associated with each of the path IDs.

Load 0,1,1 for path 1-2-4-6
Load 0,1,1 for path 1-3-4-5
Load 1,1,1 for path 1-2-3-4
Load 1,1,1 for path 1-4-5-6

The lexicographic sorting of link loads will result in a tie for paths 1-2-4-6 and 1-3-4-5, as each is 0-1-1. Similarly the sum of link loads will yield:

Load 2 for path 1-2-4-6
Load 2 for path 1-3-4-5
Load 3 for path 1-2-3-4
Load 3 for path 1-4-5-6

As a result for both ranking styles, the secondary tiebreaker of the lexicographically sorted path IDs is employed. In both cases from this secondary tie-breaker the low path (1-2-4-6) is selected. Similarly 1-3-4-5 can be selected as the high ranking path ID of the set of lowest loaded paths. In one embodiment, when low-high selection is utilized, two paths are selected. These paths can be the same or have significant overlap. For example, if the path 1-3-4-5 did not exist in the ranked list above, then the path 1-2-4-6 would qualify as both the low and high ranked paths of lowest cost. In other embodiments, an initial input to the low path selection can be from on the ranking based on the lexicographic sort of loads and the primary input to the high path selection can be from the ranking based on the sum of loads.

Whereas the example only considered the link utilization from examining one path pair, one of ordinary skill in the art would understand that after a single pass of the database, a comprehensive view of the potential traffic distribution exists and that the tie-breaking of subsequent passes will inherently avoid the maxima and therefore the load is distributed across the network more evenly. The degree of modification of load distribution proportionately diminishes with each new set of paths considered as the effect is cumulative.

The number of paths selected per iteration of the process and the cumulative number of paths a network is configured to utilize can be a function of an a priori forwarding state versus a required computational power analysis. Selecting both the lowest and highest ranked paths of lowest cost will minimize the amount of computing power required for a given improvement in standard deviation of link utilization, but will require more forwarding state as a consequence, because two sets of equal cost trees are generated per iteration. Selecting a single path permutation from each iteration will require more computing power, but will reduce the amount of forwarding database state required for a given reduction in standard deviation of utilization, because the number of times that two paths must be selected from a single lowest utilization candidate is minimized. The overall number of paths generated is determined based on a combination of both network element state and computational power considerations balanced against network efficiency. The utilization of multiple schemes for ranking path load permits more paths to be selected from a given pass of the database as it reduces the probability of the same path being selected more than once for a given number of path selections. In the above examples, two methods of ranking path load were described that would produce consistent results applied across a network. In other embodiments, additional or substitute methods of ranking could be utilized. For example, other mechanisms of ranking load that also have a locality property (any portion of the lowest loaded path is also the lowest loaded path when combined with the common algorithm tie-breaking process) and combinations of such rankings can be utilized.

Further, in the above example, link utilization is represented by the count of shortest paths that transited a link. It is possible to utilize numerous variations for representing link utilization of with greater detail and increased accuracy. Within the label information and topology database there is sufficient information such that each node in the network can determine the number of service instances that use a particular shortest path. A link utilization value can be determined based on this utilization to weight the corresponding link appropriately. By increasing the data stored by the label information or topology database, additional bandwidth profiling information per service is available for use in load distribution calculations. In another embodiment, only the minimum link metrics of the set of links in a path is utilized as representative of the maximum load that could be offered between that pair of nodes. In other embodiments, similar metrics or more detailed metrics can be utilized.

In one embodiment, all but the final pass of the topology database involves an "all pairs" computation of the shortest paths between all node pairs in the network. This can be computationally expensive due to the complexity. The load distribution process however, does not require a significant number of passes through the topology database in order to yield measurable benefits and as a result the load distribution process provides valuable overall improvements in network resource allocation that justify these "all pairs" computations.

In experimental examples utilizing random graph generation, single passes through the database after establishing the initial ECT set resulted in an approximate average reduction of 45% in the coefficient of variation in link loading measured as the count of shortest paths transiting each link in the network. A further three passes through the topology database continued to reduce the coefficient of variation to the point where there had been on average a 75% reduction, but the majority of benefit came in the first pass after establishing the baseline. Thus, the majority of the benefit in load distribution accrues in the first two passes of the database. The number of paths through the network has doubled when the second set is explicitly placed to avoid the loading of the first set. However, the rate of improvement of the coefficient of variability drops off from pass to pass much faster than the 1/2, 1/3, 1/4 rate that the cumulative path count would superficially suggest. Thus, significant results can be achieved while keeping the load distribution process tractable in terms of both computation and forwarding state.

Because the method is effectively connection oriented, and seeks out the least loaded links, any perturbation of the traffic matrix caused by a failure tends to be isolated and local in nature. The load distribution process will tend to steer data traffic back into the original distribution once a constriction in the network has been bypassed. The method also works with the emerging MPLS-TP technology base, such that operation, administration and management (OAM) protocols can be utilized unmodified and preserves the architecture and service guarantees of the MPLS network.

The load balancing process and system also enables an administrator to "pre-bias" a link with a load factor which will have the effect of shifting some load away from the particular link. This permits subtler gradations for manipulating routing behavior than simple metric modification, much simpler administration than multi-topology routing, and obviates the need for link virtualization (such as MPLS "forwarding adjacencies" as per RFC 4206) to artificially drive up the mesh density, which is done in prior load balancing systems. For the two stage sort, the timing of when the link bias is applied matters. It is typically only considered for the second and subsequent iterations. In an implementation where in the first iteration, all equal cost paths were tied for utilization (zero), applying the bias factor immediately would tend to shift all load away from that link with the bias toward the other paths resulting from the first iteration.

Figure 2:
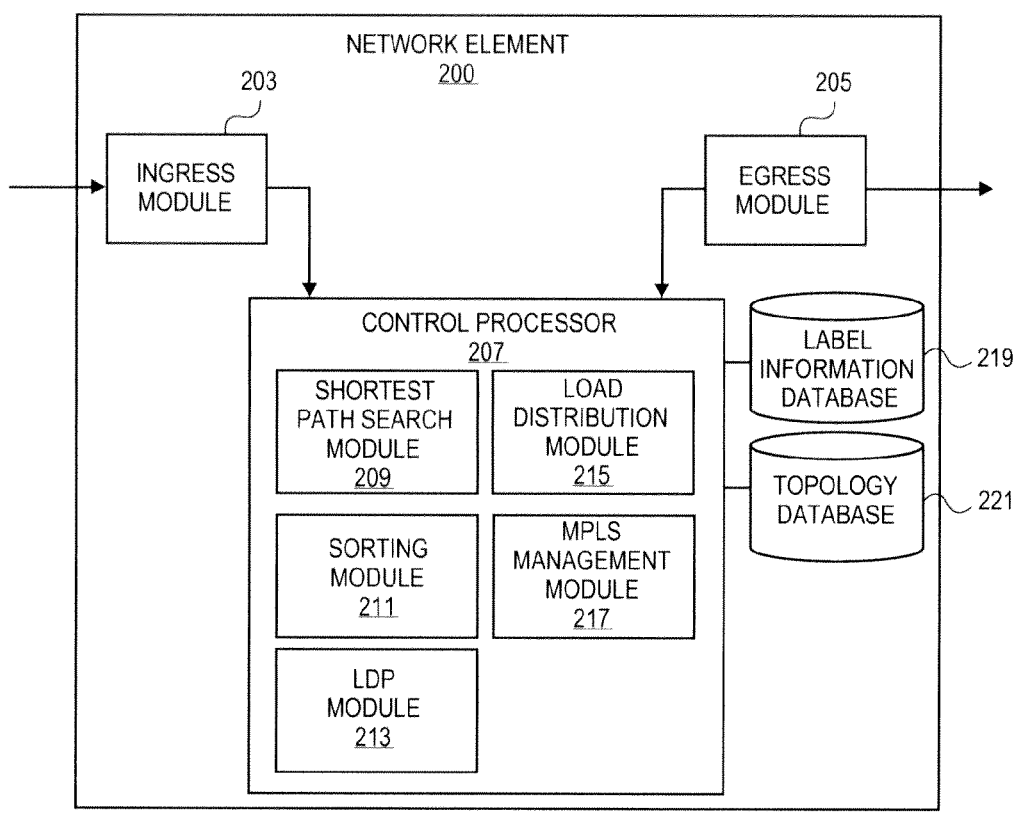
FIG. 2 is a diagram of one embodiment of a network element implementing automatic traffic engineering for a multi-protocol label switching network (MPLS).

FIG. 2 is a diagram of one embodiment of a network element implementing the load distribution method incorporating link utilization as feedback into the tie-breaking mechanism. The network element 200 can include a label information database 219, a topology database 221, an ingress module 203, an egress module 205 and a control processor 207. The ingress module 203 can handle the processing of data packets being received by the network element 200 at the physical link and data link level. The egress module 205 handles the processing of data packets being transmitted by the network element 200 at the physical link and data link level. The control processor 207 handles the routing, forwarding and higher level processing of the data traffic. The control processor 207 can execute or include a shortest path search module 209, load distribution module 215, label distribution protocol (LDP) module 213, MPLS management module 217 and sorting module 211.

The label information database 219 includes a table with label forwarding entries that define the manner in which data packets are to be forwarded. Label forwarding entries relate labels and underlying FECs and virtual topologies to network interfaces of the network element 200. This information can be utilized by the control processor 207 to determine how a data packet is to be handled, i.e., which network interface the data packet should be forward unto. The load distribution method and system creates label forwarding entries through the label distribution protocol (LDP) that implement the load distribution as described herein below.

The topology database 221 stores a network model or similar representation of the topology of the network with which the network element 200 is connected. In one embodiment, the nodes in the network are each label switch routers (LSR) and the links between the LSRs can utilize a number of underlying protocols and technologies. The nodes can be identified with unique node identifiers such as nodal loopback addresses and the links with node-identifier pairs. One skilled in the art would understand that this network model representation is provided by way of example and that other representations of the network topology can be utilized with the load distribution method and system.

A shortest path search module 209 is a component of the control processor 207 or a module executed by the control processor 207. The shortest path search module 209 traverses the topology database to determine the shortest path between any two nodes in the network topology. If there are multiple paths having an equal distance or cost in the network between two nodes and these multiple paths are all the shortest paths then these multiple equal cost paths can be provided to the sorting module 211 and load distribution module 215 to determine which to utilize. The shortest path search module 209 can determine the shortest paths between all nodes in the network topology, referred to herein as an "all pairs" computation.

The shortest path search module 209 provides a set of shortest paths for each node pair and the load distribution module 215 selects a subset of the shortest paths and updates the label information database to include a entry that implements the subset of each of the shortest paths that traverse the network element 200.

After the first pass, the shortest path search module 209 calculates the link utilization value for each link in the network topology resulting from the first pass through the topology database. The link utilization value is a count of the number of selected shortest paths that traverse a given link. A separate link utilization value is calculated and recorded for each link. These link utilization values are utilized to generate a path utilization value that in turn is used to bias the rankings of the paths for subsequent passes through the topology database where the initial tiebreaker is either the ranked list of lexicographically sorted link utilization values or the sum of link utilization values (i.e, in the form of the path utilization value), and where this results in a tie, the common algorithm tie-breaking process is used as a subsequent tie breaker.

The sorting module 211 is a component of the control processor 207 or a module executed by the control processor 207. The sorting module 211 assists the load distribution module 215 by performing an initial ranking of the loaded set of equal cost trees based on the path utilization values in the second pass and in subsequent passes.

For each node pair with multiple equal cost paths, the sorting module 211 generates a ranking of each of these equal cost paths based on path utilization values and the load distribution module 215 selects at least one path from this ranking. In other embodiments, highest ranked and lowest ranked paths can be selected to divide the load between the corresponding node pairs. The load distribution module 215 is a component of the control processor 207 or a module executed by the control processor 207.

This process can be repeated through any number of passes or iterations where the link utilization values are updated to be a cumulative indication of the set of shortest paths that transits it. The path utilization values are also updated in line with the changes to the link utilization values. The standard deviation in the variance in the paths typically diminishes with each iteration, but as the number of path sets goes up, the overall impact of each additional set is proportionately diminished, indicating that the use of more than two or three passes or iterations is not worth either the computational effort to produce or the forwarding state to instantiate. The number of passes or iterations is designated by an administrator and is configured network wide.

The MPLS management module 217 is a component of the control processor 207 or a module executed by the network processor 207. The MPLS management module 217 inspects incoming packets and determines the associated labels and performs look-ups for the packets in the label information database 219 to determine a network interface to forward the packet through. The MPLS management module 217 also performs any necessary label swapping, label addition or label removal to affect the proper traversal of the LSP for each data packet.

The LDP module 213 is a component of the control processor 207 or a module executed by the control processor 207.

The LDP module 213 generates the messages needed to establish the forwarding equivalence class (FEC) and virtual topology to label bindings in the network used to create those LSPs utilized to distribute the load of the network. The LDP module 213 generates label mapping messages that include FEC type-length-value (TLV) fields, label TLV fields, as well as a virtual topology TLV field. The topology TLV field includes a topology index indicating which iteration of the load distribution process that the label and FEC is associated with. The LDP module 213 also performs the other traditional functions to implement label distribution.

Figure 3:
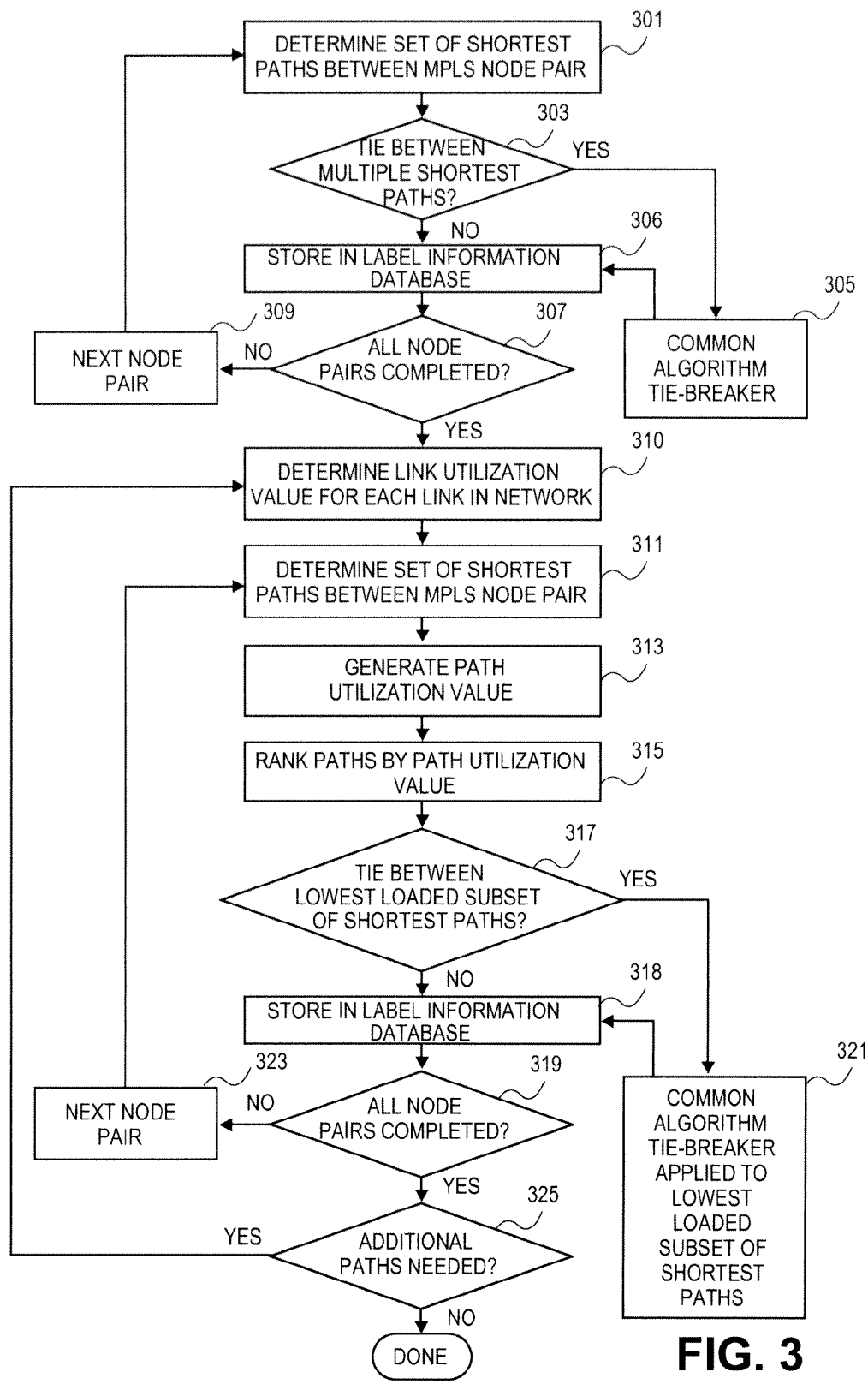
FIG. 3 is a flowchart of one embodiment of a load distribution process including automated traffic engineering that incorporates the use of link utilization as feedback into a tie-breaking mechanism.

FIG. 3 is a flowchart of one embodiment of a process for load distribution supporting automated traffic engineering for multi-protocol label switching based upon the use of link utilization as feedback into the tie-breaking mechanism for equal cost paths. In one embodiment, the process can be run at the initiation of a network element such as an link switch router, upon notification of a change in topology to the network connected to that router, at defined intervals or at similar events or times. A topology database is maintained at each network element in a network as a separate process from the load distribution process and is assumed to be a current representation of the true topology of the network.

In one embodiment, the load distribution process begins by determining a set of shortest path between a network element or MPLS node (e.g. an LSR) in the network and another network element or MPLS node in the network (Block 301). The set of shortest paths can be conceived as individual paths or as a set of trees with each network element as a root of its respective tree. A check is made to determine whether there are multiple shortest paths, that is, there is a tie for shortest path between the MPLS nodes (Block 303). If the MPLS node pair has a single shortest path between them, the label information database is updated to reflect the shortest path (Block 306). In one embodiment, the label information database is updated to reflect each of the paths that traverse the network element that maintains it. Each network element in the network performs this same calculation. The load distribution process is deterministic and thus each network element will produce the same result. Further processing of those MPLS node pairs with a single shortest path is unnecessary unless there is a change in topology.

If the MPLS node pair does not have a unique shortest path typically measured as the lowest number of hops and lowest cost then the common algorithm tie-breaking process is used to permit a unique shortest path or set of shortest paths to be selected (Block 305). In one embodiment, it is possible to select the first and last ranked paths. After the paths are selected they are stored in the label information database or utilized to update the label information database, such that all the MPLS node pairs have at least one path between them selected.

After the shortest path is selected, a check is made to determine whether all of the MPLS node pairs have had a path selected (Block 307). If further MPLS node pairs have not had a path or set of paths selected, then the process continues by selecting the next MPLS node pair to process (Block 309). If all of the MPLS node pairs have had a shortest path selected, then the process continues to a second pass or iteration.

The link utilization value for each link is calculated either as a consequence of or after the update of the forwarding database for all MPLS node pairs has completed (Block 310). The link utilization value is a count of the number of the paths that traverse each corresponding link in a topology of the network. A link utilization value is calculated for each link in the network. The link utilization value provides an indication of the level of usage and potential bottlenecks in the network that should be avoided if additional paths are to be formed.

For subsequent generation of shortest paths, tie-breaking is initially performed by generating path utilization values either as the lexicographically sorted list where the path utilization values include the link utilization values or the sum of the link utilization values. The all nodes process begins again by selecting an MPLS node pair and determining a set of shortest paths between the MPLS node pair (Block 311). This process includes path utilization values based on the link utilization values that correspond to each path (Block 313). The path utilization values can represent the overall load of each path, such as a sum of the link utilization values or can be a lexicographically sorted arrangement of the link utilization values highlighting the most or least loaded links in each path or similar arrangements and representations. The shortest paths are ranked by their path utilization value (Block 315). A check is made to determine whether there is more than one shortest path for a given MPLS node pair having equal path utilization values (Block 317).

Where a uniquely lowest loaded path exists it can be selected without further processing for all path rankings (e.g. lowest and highest). When there is more than one shortest path of identical loading (i.e., identical path utilization values), the common algorithm tie-breaking process is then used to perform path selection in this subset of lowest loaded set of shortest paths (Block 321). The ranking takes into account the link utilization value such that those paths with the lowest or the least used links, are the most likely to be selected, which takes into account the overall load of the network and not just a next hop in the network as a result, the routing throughout the network is more balanced. The label information database is then updated to reflect the selected paths (Block 318).

A check is then made to determine whether all of the MPLS node pairs have a selected shortest path or set of shortest paths (Block 319). If not, then the process continues by selecting the next MPLS node pair to process (Block 323). If the all of the MPLS node pairs have been calculated, then a check is made to determine whether additional paths are needed (Block 325). If no additional paths are needed (this may be a parameter that is set by a network administrator or similarly determined), then the load distribution process ends. If additional paths are needed, then the process continues with a third pass or iteration that is similar to the second, but builds on the link utilization determined in previous iterations. This process can have any number of iterations.

Figure 4:
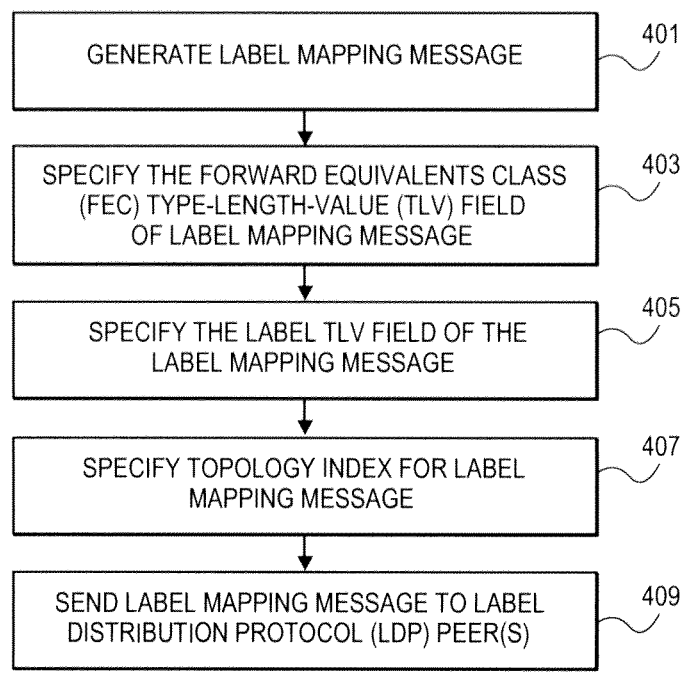
FIG. 4 is a flowchart of one embodiment of a process for generating a label mapping message as part of the label distribution protocol.

FIG. 4 is a flowchart of one embodiment of a process for generating a label mapping message as part of the label distribution protocol. In one embodiment, the process is initiated in response to a change in topology or a change to a label information database for the network. In another embodiment, the process is periodically initiated to maintain the state of the MPLS network. The process is initiated by each node generating a label mapping message to be sent to one of its peers (Block 401).

The label mapping message includes a number of type-length-value (TLV) fields. A separate label mapping message is generated for each forwarding equivalency class (FEC) and each topology path or tree in the topology of the network as represented in the label information base of the host node. For each label mapping message the corresponding field equivalency class is defined in an FEC TLV field of the label mapping message (Block 403).

The label TLV field of each of the label mapping messages is also defined according to the label assigned to an LSP for each of the interfaces in the path (Block 405). A topology index is also defined in the label mapping message (Block 407). The topology index indicates the iteration of the selection process of the LSP defined by the label mapping message. For example, if the label mapping message corresponds to the first selected tree or path, then the topology index of zero or one may be selected and inserted into the label mapping message. Similarly, if a second path or tree corresponds to the message then a one or two may be specified as the value. Once each of the label mapping messages is defined and each of its values specified, then the label mapping message can be sent to each of the label distribution protocol peers (Block 409). In one embodiment, the topology index is included in an existing TLV of a label mapping message. In another embodiment, a topology TLV is defined for the label mapping message.

Figure 5:
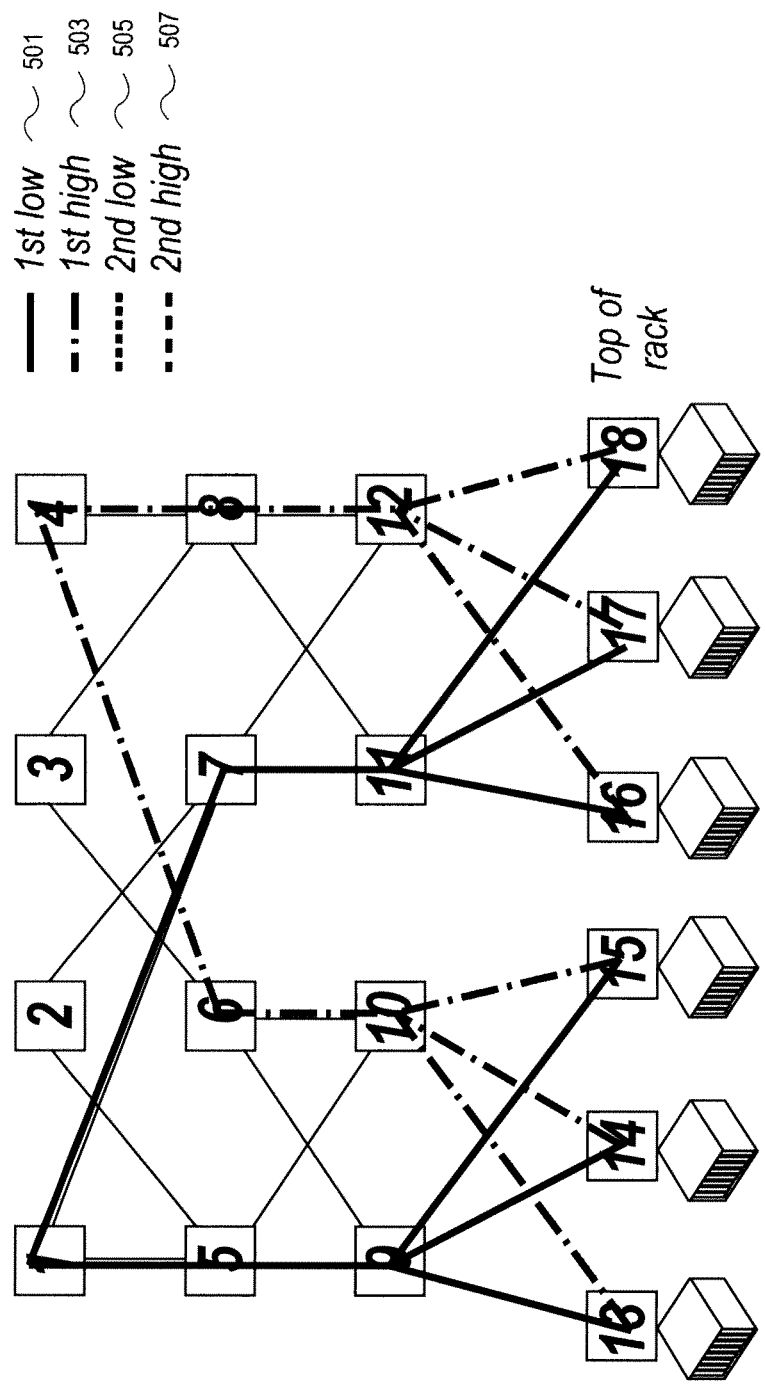
FIG. 5 is a diagram of an example of a multi-point to multi-point network topology.

FIG. 5 is a diagram of one embodiment of a multi-point to multi-point network including a set of label switch routers (LSRs) 1-18. The diagram shows a set of paths or trees defined by the first iteration of the above defined process for the given example. The diagram assumes that ingress into this network can be distributed over nodes 1-4 and likewise 13-18, in other words these LSRs are at the edge of the network but have the same external interfaces. In this example, in the first pass the process would generate a set of lexicographically sorted unique paths for all node pairs from 1-13 to 4-18 (e.g., 1-5, 5-9, 9-13 and 4-8, 8-12, 12-18) from this set of unique paths the example assumes that a low and high path from the ranking of these unique path identifiers is selected, which correspond to trees 501 and 503.

Figure 6:
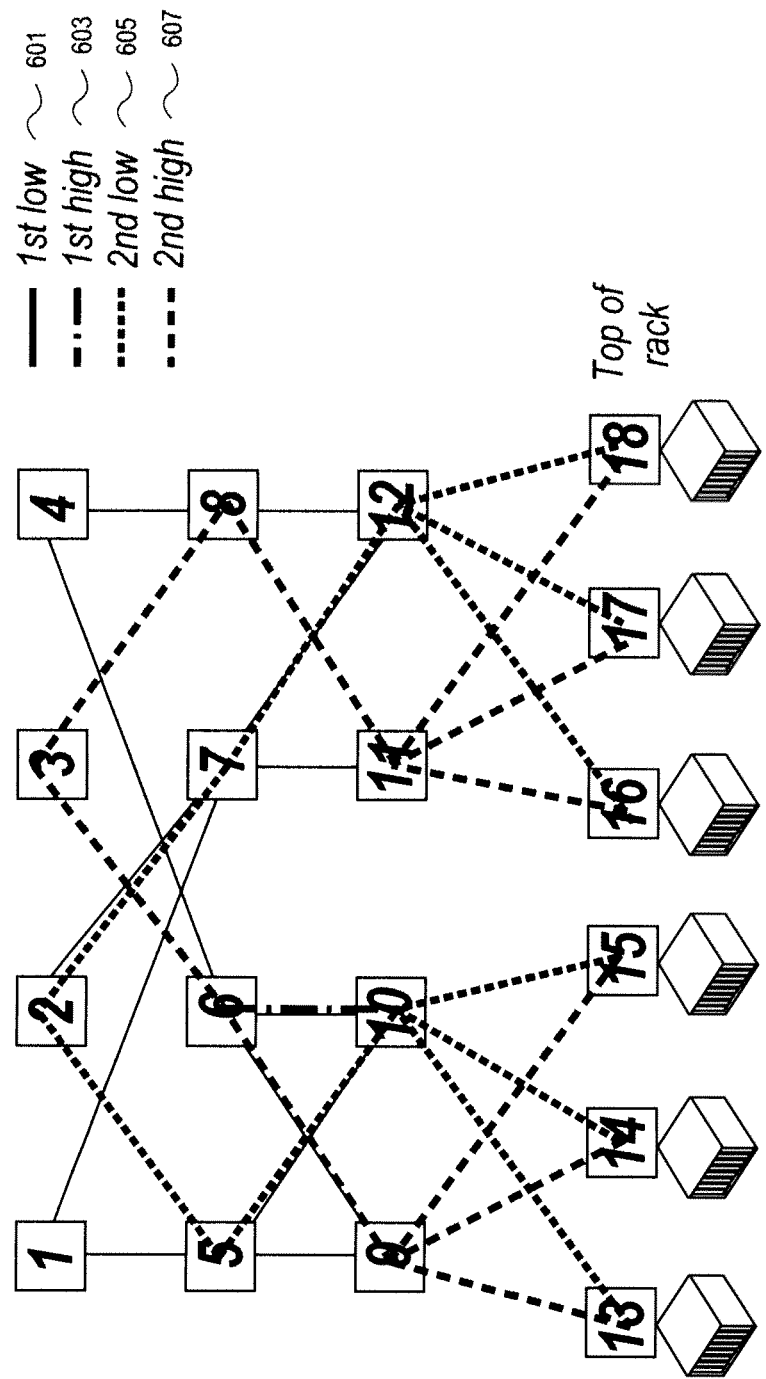
FIG. 6 is a diagram of another example of a multi-point to multi-point network topology.

FIG. 6 shows paths or trees selected in the second iteration of the load distribution method set forth herein above. In this example, the load distribution method finds two paths where the lexicographic ordering of the link load associated with each path produces a tie between two paths, and the exemplar lexographic ordering of node IDs as a path identifier is invoked to authoritatively resolve the tie. The lowest ranked tree 605 and the highest rank 607 from the second iteration further distributes the traffic between the nodes 1-4 and the nodes 13-18 and supplements the lowest ranked tree 601 and highest ranked tree 603 from the first iteration illustrated in FIG. 5. By incorporating the link usage value in the lexicographical sorting, the second iteration selects equal cost paths that have the least utilized links thereby increasing the utilization of bandwidth and the diversity of the topology of the selected "all pairs" paths.

Figure 7:
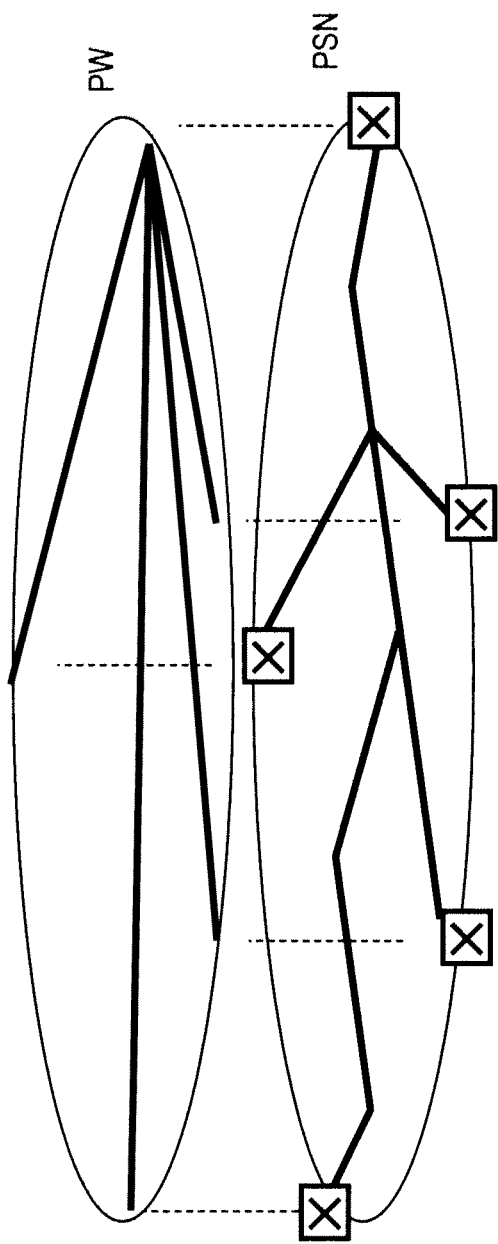
FIG. 7 is a diagram of one embodiment of a mapping of a set of pseudo wires to the underlying packet switch network to support operations, administration and maintenance (OAM) in the MPLS network.

FIG. 7 is a diagram of one embodiment of a mapping of a set of pseudo wires to the underlying packet switch network to support operations administration and maintenance (OAM) in the MPLS network. Performance monitoring can be maintained and compatibility maintained with the traffic engineering system by overlying a full mesh of peer to peer LSPs between the end points equivalent to a set of pseudo wires. The packet switch network scales order (N) and fault management can scale accordingly, but the overlay has peer to peer properties required for performance monitoring. The FECs of the pseudo wires are modified to bind the pseudo wire FEC to a PSN virtual topology index. As the PSN topology is logically peer to peer between the pseudo endpoints, the pseudo wire label provides a means of source disambiguation for OAM counters.

Thus, a method, system and apparatus for load distribution in an MPLS network that takes into account link usage has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a node of a multi-protocol label switching (MPLS) network for improved load distribution, wherein the node is one of a plurality of nodes in the MPLS network each of whish implement a common algorithm tie-breaking process to produce minimum cost shortest path trees, the node includes a topology database to store a topology of the MPLS network, wherein the topology of the MPLS network includes a plurality of nodes and links between the nodes, the method comprising the steps of:
determining a first set of one or more shortest paths between each MPLS node pair in the MPLS network by executing a shortest path search algorithm on the topology of the MPLS network stored in the topology database;
selecting at least a first shortest path from the first set of shortest paths for each MPLS node pair, by applying the common algorithm tie-breaking process;
calculating a link utilization value for each link of the MPLS network based on the count of shortest paths selected that transit each link;
determining a second set of one or more shortest paths between each MPLS node pair in the MPLS network by executing the shortest path search algorithm on the topology of the MPLS network stored in the topology database;
generating a path utilization value for each shortest path in the second set of one or more shortest paths based on link utilization values corresponding to each shortest path;
selecting a second shortest path from the second set of one or more shortest path on the basis of said path utilization value, wherein the selecting utilizes the common algorithm tie-breaking process when multiple shortest paths having equal path utilization values are present in the set of one or more shortest paths; and
storing at least the first shortest path and the second paths for each MPLS node pair in a label information database, wherein the label information database indicates where to forward traffic incoming to the MPLS node, whereby the selection of the second subsets in light of path utilization minimizes the standard deviation of load distribution across the entire MPLS network.

2. The method of claim 1, wherein said step of generating said path utilization value comprises:
summing link utilization values corresponding to each path, or
lexicographically sorting the link utilization values corresponding to each path.

3. The method of claim 2, further comprising the steps of:
receiving a link modification factor from an administrator; and
combining the link modification factor with the link utilization value to weight a corresponding one of the links and paths to decrease usage of the link by decreasing a likelihood of selection by affecting the ranking of the set of lowest loaded path.

4. The method of claim 2, further comprising the steps of:
ranking each shortest path in the second set of shortest paths based on corresponding path utilization values,
wherein said step of selecting at least the second shortest path further comprises:
selecting from the ranking a highest and lowest ranked shortest path.

5. The method of claim 2, further comprising the steps of:
iteratively selecting additional shortest paths to share load distribution with the first shortest path and second shortest path until an administered number of paths reflecting a network operators desire for overall improvement for the Ethernet network is met.

6. The method of claim 1 wherein the sets of shortest paths between MPLS node pairs re implemented as label switched paths within the MPLS network.

7. The method of claim 1, further comprising the steps of:
generating a label mapping message;
defining a FEC type-tenth-value (TLV) field in the label mapping message;
defining a label TLV field in the label mapping message;
defining a topology index for the label mapping message, wherein the topology index indicates an iteration in the steps of selecting the first subset and second subset; and
sending the label mapping message to each label distribution protocol peer in the MPLS network.

8. The method of claim 7, wherein label mapping messages are sent to each LDP peer for each combination of FEC and topology-index values.

9. A network element for improved load distribution in a multi-protocol label switching (MPLS) network that includes the network element, wherein the network element is one of a plurality of nodes in the MPLS network, wherein a topology of the MPLS network includes a plurality of nodes and links between the nodes, the network element comprising:
a topology database to store link information for each link in the MPLS network;
a label information database to store label information for each port of the network element, wherein the label information database indicates where to forward each forwarding equivalency class (FEC) incoming to the network clement;
a control processor coupled to the topology database and the label information database, the network processor configured to process data traffic, wherein the network processor comprises:
an MPLS management module configured to forward data traffic over label switch paths (LSPs);
a label distribution protocol (LDP) module configured to establish LSPs in the MPLS network;
a shortest path search module configured to determine at least one shortest path between each MPLS node pair in the MPLS network by executing a shortest path search algorithm on the topology database, wherein the shortest path search module is configured to send, for each of the MPLS node pairs with a plurality of equal cost shortest paths, the equal costs shortest paths to a load distribution module;
a sorting module configured to rank each of the plurality of equal cost shortest paths based on a path utilization value derived from link utilization values associated with each path in the plurality of equal cost shortest paths; and
the load distribution module configured to select, from the plurality of equal cost shortest paths received, a first subset of the plurality of equal cost shortest paths for that MPLS node pair to be used to share data traffic load between the MPLS node pair and to select, based on the path utilization value, a second subset from the plurality of equal cost shortest paths for that MPLS node pair to be used to share data traffic load with the first subset for that Ethernet Bridge pair,
whereby the selection of the second subset in light of the path utilization value minimizes the standard deviation of load distribution across the entire MPLS network.

10. The network element of claim 9, wherein the sorting module is further configured to sort the link utilization values lexicographically to create a ranking of the plurality of equal cost shortest paths.

11. The network element of claim 9, wherein the shortest path search module is further configured to calculate the link utilization value for each link in the topology.

12. The network element of claim 9, wherein the control processor is further configured to generate label switch paths (LSPs) to implement each selected shortest paths between node pairs within the MPLS network.

13. The network element of claim 9, wherein the load distribution module is further configured to receive a link modification factor from an administrator and combine the link modification factor with the link usage value to weight a corresponding link in a path to decrease usage of the link by decreasing a likelihood of selection by affecting the lexicographical sorting of that path.

14. The network element of claim 9, wherein the load distribution module is further configured to select the first subset from each of the plurality of equal cost shortest paths by selecting a highest and lowest item in the first ranking of equal cost shortest paths.

15. The network element of claim 9, wherein the load distribution module is further configured to select the second subset from each the plurality equal cost shortest paths by selecting a highest and lowest item by applying a common algorithm tie-breaking process to the equal cost shortest paths having a lowest load.

16. The network element of claim 9, wherein the sorting module and load distribution module are further configured to iteratively select additional subsets to share load distribution with the first subset and second subset.

17. The network element of claim 9, wherein the LDP module is further configured to generate a label mapping message including an FEC type length-value (TLV) field in the label mapping message, a label TLV field in the label mapping message, a topology index for the label mapping message, wherein the topology index indicates an iteration in the steps of selecting the first subset and second subset and is further configured to send the label mapping message to each label distribution protocol peer in the MPLS network.

18. The network element of claim 17, wherein the LDP module is further configured to send label mapping messages to each LDP peer for each combination of FEC and topology index.

* * * * *

UNITED STATES PATENT AND TRADEMARK OFFICE
CERTIFICATE OF CORRECTION

PATENT NO. : 8,553,562 B2  Page 1 of 1
APPLICATION NO. : 12/877830
DATED : October 8, 2013
INVENTOR(S) : Allan et al.

It is certified that error appears in the above-identified patent and that said Letters Patent is hereby corrected as shown below:

In the Specifications

In Column 1, Line 22, delete "proving" and insert -- for improving --, therefor.

In Column 10, Line 11, delete "a entry" and insert -- an entry --, therefor.

In Column 12, Line 62, delete "an FEC" and insert -- a FEC --, therefor.

In Column 13, Line 35, delete "lexographic" and insert -- lexicographic --, therefor.

In the Claims

In Column 14, Line 9, in Claim 1, delete "whish" and insert -- which --, therefor.

In Column 14, Line 40, in Claim 1, delete "second" and insert -- second shortest --, therefor.

In Column 15, Line 7, in Claim 6, delete "claim 1" and insert -- claim 1, --, therefor.

In Column 15, Line 12, in Claim 7, delete "type-tenth-value" and insert -- type-length-value --, therefor.

In Column 15, Line 35, in Claim 9, delete "clement;" and insert -- element; --, therefor.

In Column 16, Line 46, in Claim 17, delete "an FEC" and insert -- a FEC --, therefor.

Signed and Sealed this
Fifteenth Day of April, 2014

Michelle K. Lee
*Deputy Director of the United States Patent and Trademark Office*